(12) United States Patent  
Allee et al.

(10) Patent No.: US 8,860,575 B2  
(45) Date of Patent: Oct. 14, 2014

(54) FLEXIBLE IDENTIFICATION SYSTEMS AND RELATED METHODS

(75) Inventors: David R. Allee, Phoenix, AZ (US); Lawrence T. Clark, Phoenix, AZ (US); Terry L. Alford, Phoenix, AZ (US); Constantine A. Balanis, Mesa, AZ (US); James T. Aberle, Tempe, AZ (US); Kevin Baugh, Reston, VA (US)

(73) Assignee: Arizona Board of Regents, a body corporate of the State of Arizona, Acting for and on behalf of Arizona, State University, Scottsdale, AZ (US)

( * ) Notice: Subject to any disclaimer, the term of this patent is extended or adjusted under 35 U.S.C. 154(b) by 322 days.

(21) Appl. No.: 13/306,750

(22) Filed: Nov. 29, 2011

(65) Prior Publication Data

US 2012/0070158 A1     Mar. 22, 2012

Related U.S. Application Data

(63) Continuation of application No. PCT/US2010/034976, filed on May 14, 2010.

(60) Provisional application No. 61/182,278, filed on May 29, 2009.

(51) Int. Cl.
| | | |
|---|---|---|
| G08B 13/14 | (2006.01) | |
| G06K 19/077 | (2006.01) | |
| G06K 19/02 | (2006.01) | |
| H04W 52/02 | (2009.01) | |

(52) U.S. Cl.
CPC ........ G06K 19/07766 (2013.01); G06K 19/025 (2013.01); G06K 19/027 (2013.01); *H04W 52/0235* (2013.01)

USPC .................................. 340/572.1; 340/572.8

(58) Field of Classification Search
CPC .............. G06K 19/025; G06K 19/027; G06K 19/0705; G06K 19/0724; G06K 19/07345; G06K 19/07767; G07C 5/008; G07C 9/00111
USPC ........................ 340/572.1, 572.7, 572.8, 10.1
See application file for complete search history.

(56) References Cited

U.S. PATENT DOCUMENTS

| | | | |
|---|---|---|---|
| 6,278,413 B1 * | 8/2001 | Hugh et al. .................... | 343/818 |
| 6,510,380 B1 * | 1/2003 | Curatolo et al. .............. | 701/468 |
| 7,251,805 B2 * | 7/2007 | Koo ................................ | 326/41 |
| 7,467,034 B2 * | 12/2008 | Breed et al. ................... | 701/29.6 |
| 7,511,616 B2 * | 3/2009 | Lake .......................... | 340/572.1 |
| 7,994,715 B2 * | 8/2011 | Buchhauser et al. ......... | 313/509 |
| 8,030,745 B2 * | 10/2011 | Yamazaki ..................... | 257/679 |
| 2002/0070874 A1 | 6/2002 | Williams et al. | |
| 2007/0103316 A1 | 5/2007 | Tuttle | |
| 2011/0169610 A1 * | 7/2011 | Geissler et al. .............. | 340/10.1 |
| 2011/0248834 A1 * | 10/2011 | Warner et al. ............... | 340/10.34 |

FOREIGN PATENT DOCUMENTS

WO     2004068387 A1     8/2004

OTHER PUBLICATIONS

ISR and Written Opinion for corresponding Int'l Application No. PCT/US2010/034976 dated Feb. 28, 2011.

IPR on Patentability (Chapter 1 of the Patent Cooperation Treaty) Application No. PCT/US2010/034976 dated Dec. 8, 2011.

* cited by examiner

*Primary Examiner* — John A Tweel, Jr.

(74) *Attorney, Agent, or Firm* — Bryan Cave LLP

(57) ABSTRACT

Embodiments of flexible identification systems are described herein. Other embodiments and related methods are also disclosed herein.

30 Claims, 4 Drawing Sheets

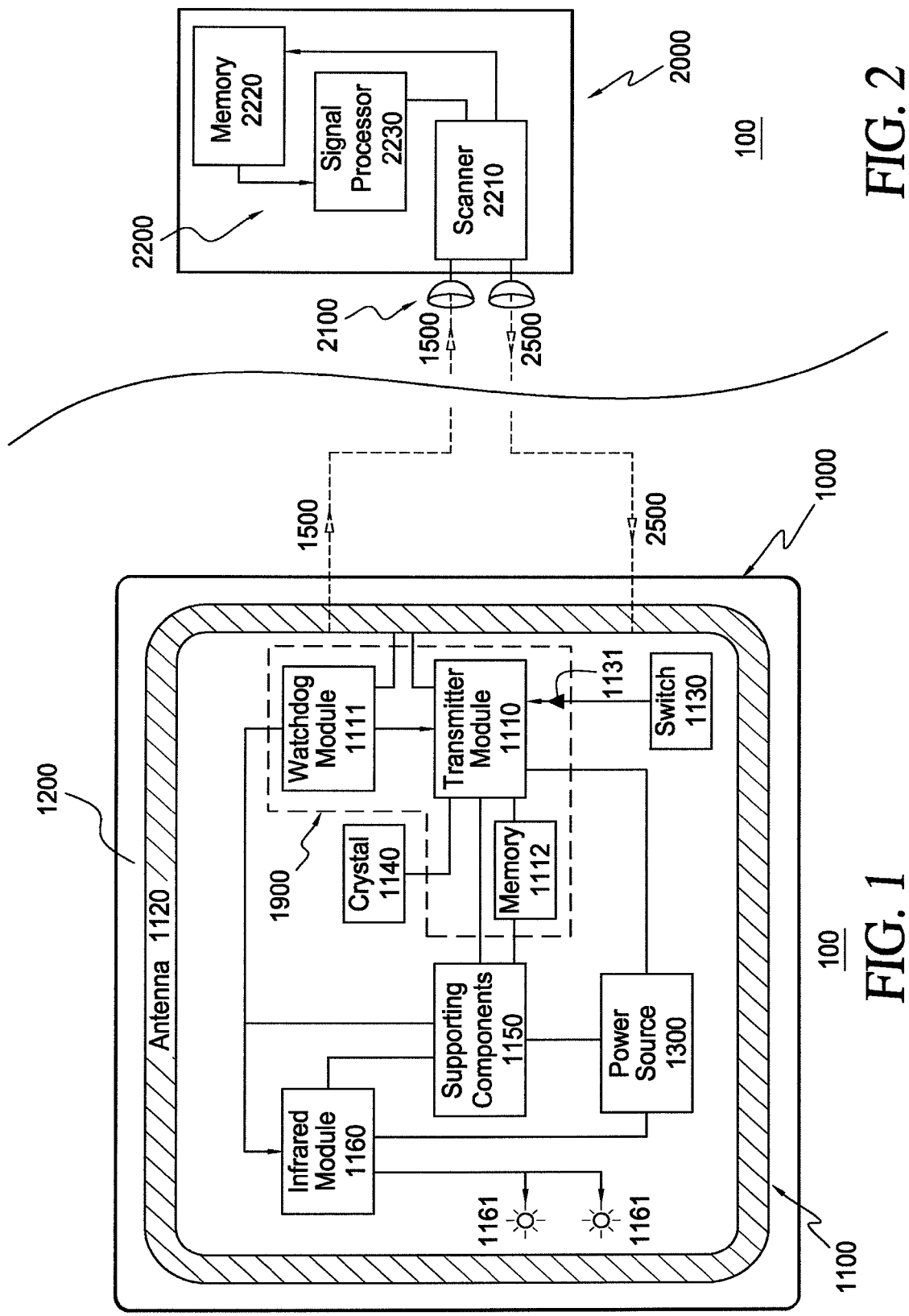

FLEXIBLE IDENTIFICATION SYSTEMS AND RELATED METHODS

CROSS REFERENCE TO RELATED APPLICATIONS

This is a continuation application claiming priority to PCT Patent Application No. PCT/US2010/034976, titled "Flexible Identification Systems And Related Methods, and filed on May 14, 2010, which claims priority to U.S. Provisional Patent Application 61/182,278, titled "Flexible Identification Systems And Related Methods," and filed on May 29, 2009. The disclosures of the references listed above are incorporated herein by reference.

STATEMENT REGARDING FEDERAL GOVERNMENT SPONSORSHIP

At least part of the disclosure herein was funded with government support under grant number W911NF-04-2-0005, awarded by the Army Research Laboratory. The United States Government may have certain rights in this invention.

FIELD OF THE INVENTION

This invention relates generally to identification and/or tracking systems, and relates more particularly to systems and methods for remote identification.

BACKGROUND

In the current state of world affairs, the need to identify, track, and/or locate persons or assets has heightened as a result of threats posed by rogue groups such as insurgents, terrorists, and gangs. As an example, kidnapped soldiers, journalists, civilians, and other personnel must be identified, tracked, and located for rescue within a few hours of being taken hostage to improve their chances of survival. Relevant assets also need to be identified, tracked, and located when hijacked to improve the chances of recovery. Identification or tracking tags used to permit remote identification, tracking, and/or location of such persons or assets usually must be inconspicuous enough to avoid detection by kidnappers, hijackers, or other similar rogue parties. As an example, high metal content in such tags may render the tags subject to discovery by a metal detector/magnetometer. Tags that are large and/or rigid would also tend to be more easily detected by such rogue parties.

Accordingly, a need exists for identification tags as part of a system for remote tracking and/or location thereof, where the identification tags are easily concealable for hostages and/or relevant assets, and/or where the identification tags comprise a limited magnetometric signature.

BRIEF DESCRIPTION OF THE DRAWINGS

To facilitate further description of the embodiments, the following drawings are provided in which:

FIG. 1 illustrates a block diagram of an ID tag for an identification system.

FIG. 2 illustrates a block diagram of a detection mechanism configured to detect a location of the ID tag of FIG. 1.

Figure 3:
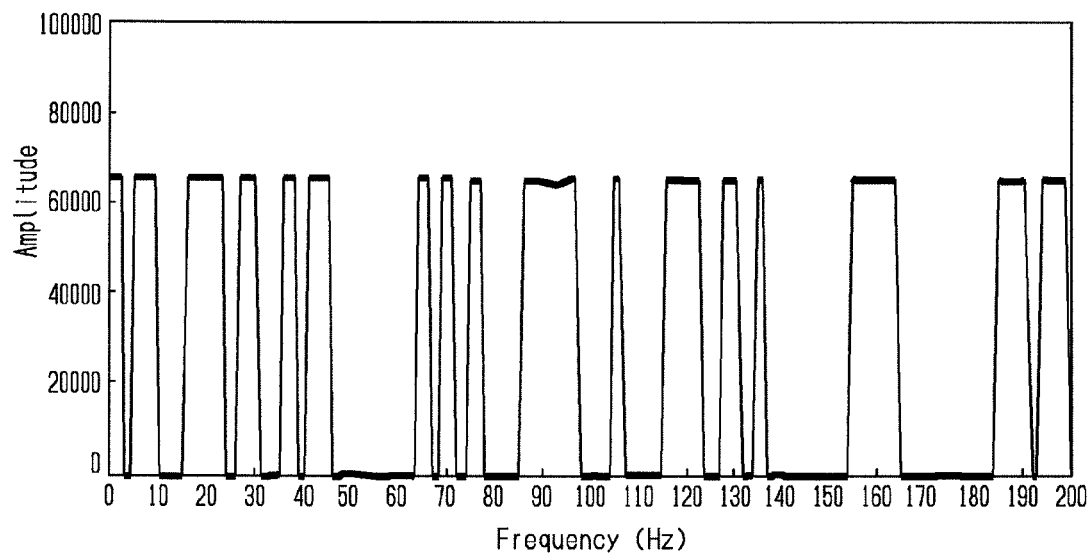
FIG. 3 illustrates a first plot of a scan by the detection mechanism of FIG. 2 for a beacon signal from the ID tag of FIG. 1, where the scan has not been signal averaged.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling"

and the like should be broadly understood and include mechanical coupling of all types. The absence of the word "removably," "removable," and the like near the word "coupled," and the like does not mean that the coupling, etc. in question is or is not removable.

DETAILED DESCRIPTION

In one embodiment, a system can be use for remote identification or tracking of an apparatus comprising an identification (ID) tag. The apparatus of the system can comprise a plastic substrate, with a beacon circuit and a power source coupled thereto, and where the plastic substrate is flexible. The beacon circuit can comprise a transmitter module coupled to the plastic substrate, an antenna supported by the plastic substrate and coupled to the transmitter module; and one or more supporting components supported by the plastic substrate. The power source can also be coupled to the plastic substrate to power the transmitter module. The transmitter module of the beacon circuit can be configured to alternate between a sleep mode to conserve a charge of the power source, and an active mode for transmission of a beacon signal via the beacon circuit.

Turning to the drawings, FIG. 1 illustrates a diagram of identification tag (ID tag) 1000 of identification system 100. FIG. 2 illustrates a diagram of detection mechanism 2000 of identification system 100, where detection mechanism 2000 is configured to detect a location of ID tag 1000. Identification system 100 and its components are merely exemplary and not limited to the embodiments presented herein. Identification system 100 can be employed in many different embodiments or examples not specifically depicted or described herein.

In the present example, ID tag 1000 comprises beacon circuit 1100 on substrate 1200, where substrate 1200 is flexible, and beacon circuit 1100 is configured to flex along with substrate 1200. Beacon circuit 1100 of ID tag 1000 is configured in the present example to emit beacon signal 1500, where beacon signal 1500 is traceable by detection mechanism 2000 (FIG. 2) to determine the location of ID tag 1000.

As described above in the Background section, there may be situations where the ability of ID tag 1000 to remain inconspicuous would be desirable. With such situations in mind, ID tag 1000 can be configured to limit its detectability by magnetometers, such as by selecting substrate 1200 to comprise a plastic and/or non-metallic substrate. As an example, substrate 1200 can comprise a flexible polyethylene naphthalate (PEN) material, such as that available from Teijin DuPont Films of Tokyo, Japan under the trade name planarized "Teonex® Q65," a polyethylene terephthalate (PET) material, a polyethersulfone (PES) material, a polyimide, a polycarbonate, a cyclic olefin copolymer, and/or a liquid crystal polymer.

In some examples, substrate 1200 can serve as a base upon which at least part of the components of beacon circuit 1100, such as supporting components 1150, can be coupled. As seen in FIG. 1, supporting components 1150 can be coupled between one or more elements of beacon circuit 1100, and can be used, for example, to interconnect such elements and/ or to facilitate signal acquisition and/or data transfer. Supporting components 1150 can comprise active and/or passive components in some examples, such as diodes, transistors, resistors, capacitors, and/or inductors. In the same or other examples, supporting components 1150 can comprise solid state devices fabricated over substrate 1200. Such integration of components fabricated over a plastic substrate like substrate 1200 can be stealthy against metal detectors. For example, in one embodiment, a full, 4 inch diagonal, active matrix backplane with 240 metal rows, 320 metal columns and approximately 70,000 a-Si:H thin film transistors on a flexible plastic substrate will barely register a signal on airport-grade magnetometers. A smaller piece of flexible circuitry, such as ID tag 1000, would be much harder to detect, or undetectable, by such magnetometers.

Substrate 1200, in addition to contributing to the stealthiness of ID tag 1000 by virtue of its non-metallic characteristics, can also permit ID tag 1000 to be more concealable as a result of its flexibility. For example, in one embodiment, ID tag 1000 can be shaped as a long flexible strip suitable for flexing along, and concealing within, a collar of a shirt. In other embodiments, ID tag 1000 can also be flexibly concealed at other locations of clothing or on equipment of an individual to be tracked.

In the present example, beacon circuit 1100 of ID tag 1000 comprises transmitter module 1110 coupled to substrate 1200. In addition, beacon circuit 1100 comprises antenna 1120 coupled to transmitter module 1110 and supported by substrate 1200 in the present embodiment, where antenna 1120 is fabricated over substrate 1200. In the same or other embodiments, antenna 1120 can be fabricated along with, and/or form part of, supporting components 1150. In other embodiments, antenna 1120 is not fabricated over substrate 1200, but still can be coupled to substrate 1200 and affixed thereto by suitable fasteners such as an adhesive. There can also be other embodiments where antenna 1120 is embedded within substrate 1200. Regardless of its location, the shape or configuration of antenna 1120 can be different from that shown in FIG. 1. As an example, antenna 1120 can have a bowtie shape or other shape or configuration.

ID tag 1000 also comprises power source 1300 coupled to and/or located over plastic substrate 1200, where power source 1300 is configured to power transmitter module 1110. Power source 1300 can also power a portion of or all of the other components of beacon circuit 1100. In the present example, power source 1300 comprises a battery. In the same or other examples, power source 1300 can comprise a flexible lithium battery having a charge capacity of at least approximately 10 milliamp hours (mAh). To be flexible along with substrate 1200, power source 1300 can comprise a thickness of approximately 0.37 millimeters (mm) or less in some embodiments. There can be embodiments where power source 1300 can comprise a width or length of approximately 30 mm or less.

Transmitter module 1110 of beacon circuit 1100 is configured in the present embodiment to alternate its operation between an active mode and a sleep mode, where the active mode comprises a state wherein transmitter module 1110 emits beacon signal 1500 via beacon circuit 1100 to permit tracking and/or location of ID tag 1000 by detection mechanism 2000 (FIG. 2). In the same or a different embodiment, beacon signal 1500 can be transmitted via antenna 1120. Beacon signal 1500 can be transmitted in several different formats, depending on the implementation of beacon circuit 1100. For example, in one embodiment, beacon circuit 1100 can be configured to emit beacon signal 1500 as an ultra high frequency (UHF) radio signal. In other embodiments, beacon signal 1500 may be emitted as an ultra wide band (UWB) signal at a frequency of over 1 gigahertz (GHz). To aid in tracking and/or locating ID tag 1000, beacon circuit 1100 can be configured to emit beacon signal 1500 to be decipherable at a range of at least 1 kilometer by detection mechanism 2000 via filtering mechanisms, as will be described further below. There can also be embodiments where beacon signal 1500 is emitted periodically or intermittently rather than continuously to conserve power and/or to minimize unintended detection. In one embodiment, power source 1300 can be configured to power beacon circuit 1100 to emit beacon signal 1500 intermittently or constantly for at least approximately 24 hours.

The sleep mode of transmitter module 1110 can comprise a state wherein the functionality of transmitter module 1110 is limited to conserve a charge of power source 1300. For example, during sleep mode, transmitter module 1110 is configured in the present embodiment to wait for activation signal 1131 from activation switch 1130. Switch 1130 can be coupled to beacon circuit 1100 to manually activate the active mode for transmitter module 1110 when switch 1130 is actuated. Switch 1130 can comprise a suitable switching mechanism, such as a pushbutton or a slider, to actuate switch 1130. In the same or other embodiments, the sleep mode can comprise an off mode, where transmitter module 1110 and/or other parts of beacon circuit 1100 are turned off.

In the present embodiment, beacon circuit 1100 also comprises a watchdog module 1111 coupled to transmitter module 1110, where watchdog module 1111 comprises a wireless receiver configured to scan constantly or intermittently during the sleep mode for wake-up signal 2500 from detection mechanism 2000. The wireless receiver of watchdog module 1111 can be coupled to antenna 1120 in the same or other examples to receive wake-up signal 2500. When watchdog module 1111 receives and/or deciphers wake-up signal 2500, watchdog module 1111 enables the active mode for beacon circuit 1100. There can be other embodiments, however, where beacon circuit 1100 comprises only one of switch 1130 or watchdog module 1111 to toggle beacon circuit 1100 from the sleep mode to the active mode and/or vice versa.

The present embodiment of beacon circuit 1100 comprises integrated circuit 1900, where integrated circuit (IC) 1900 comprises one or more components of beacon circuit 1100 on a single chip. In the present example, IC 1900 comprises transmitter module 1110, watchdog module 1111, and memory module 1112.

In some embodiments, IC 1900 can comprise a commercial, off the shelf (COTS) packaged circuit coupled to substrate 1200 to interface with other components of beacon circuit 1100. For example, such COTS IC 1900 can comprise in some embodiments an rfPIC® 12C509 microcontroller (rfPIC) from Microchip Technology Inc., of Chandler, Ariz., USA. This microcontroller comprises a small surface mount component having an instruction set of 33 instructions, an integrated 4 megahertz (MHz) clock oscillator, and a 1 kilobyte program memory suitable for implementing beacon circuit 1100. During sleep mode, the rfPIC draws less than 1 microamp of current and can wake up via an external pushbutton. The rfPIC also has a built-in transmitter for frequency shift keyed or amplitude shift keyed data transmission at 0 to 20 kilobytes per section (kbps). The output power is adjustable between −12 dBm to +10 dBm (where dBm is the power level in decibels referenced to one milliwatt of current), and the transmission frequency can be set with an external crystal. In the present example of FIG. 1, crystal 1140 can be used to set the transmission frequency of beacon signal 1500 for transmitter module 1110.

In other embodiments, IC 1900 can comprise an application-specific-integrated-circuit (ASIC) coupled to substrate 1200 to interface with other components of beacon circuit 1100. In such embodiments, the ASIC circuit can comprise an unpackaged or bare die that is directly mounted onto substrate 1200. In the same or other embodiments, the bare die of the ASIC of IC 1900 can be thinned to reduce restrictions in the flexibility of substrate 1200 of ID tag 1000. In such embodiments, the bare die can comprise a thickness of approximately 100 micrometers or less, and/or can be configured to flex along with plastic substrate 1200.

There can be embodiments where transmitter module 1110 need not rely on crystal 1140 to set a transmission frequency for transmission module 1110. In such embodiments, crystal 1140 can be omitted, and beacon circuit 1100 IC 1900 can be configured to generate beacon signal 1500 as an UWB signal and/or at a transmission frequency over 1 GHz. In the same or other embodiments, if the transmission frequency cannot be accurately controlled by a crystal, detection mechanism 2000 can be configured to decipher a fundamental frequency of beacon signal 1500, rather than scanning for beacon signal 1500 at a crystal-set frequency. In some embodiments, the high speeds for the UWB transmission can be achieved by fabricating IC 1900 using a 90 nanometer (nm) semiconductor manufacturing process from International Business Machines (IBM) of Armonk, N.Y., USA. In the same or other embodiments, IC 1900 can be configured to generate the UWB transmission in conformance with Federal Communication Commission (FCC) guidelines, although this conformance might not be necessary for some applications. There can also be embodiments where the UWB transmission can be facilitated using a bowtie antenna design for antenna 112, although a loop antenna design can also work for some applications.

In embodiments where crystal 1140 is omitted, watchdog module 1111 can still be configured to properly enable the active mode without relying on a specific frequency to determine receipt of wake up signal 2500. For example, watchdog module 1111 can be coupled to memory module 1112 and to an internal clock of IC 1900, where memory module 1112 stores an identification code for ID tag 1000. The identification code can be configured to define one or more time intervals or ratios between sequential receipt of two or more radio frequency, radar, or other high frequency pulses of wake-up signal 2500, where the two or more pulses may comprise amplitude-shift-keying (ASK). Watchdog module 1111 can access the identification code in memory module 1112 to determine the one or more time intervals or ratios to expect during receipt of wake-up signal 2500. When the wireless receiver of watchdog module 1111 receives the two or more radio frequency, radar, or other high frequency pulses of wake-up signal 2500 correspondingly separated by the one or more sequential time intervals or ratios defined by the identification code, watchdog module 1111 enables the active mode for transmission of beacon signal 1500 via transmitter module 1110.

As an example of the watchdog operation described above, the identification code in memory 1112 defines a code of four pulses separated by times T, 3T and 7T. The wireless receiver of watchdog module 1111 will trip a comparator when each pulse of wake-up signal 2500 is detected. The internal clock of IC 1900 will count between each of the pulses at an arbitrary frequency. If a count receipt sequence with a 1:3:7 ratio is found (with some rounding tolerances), watchdog module 1111 will enable the active mode for transmitter module 1110.

In some examples, the identification code may be specific to distinguish tag 1000 from other similar ID tags, such that only ID tag 1000 (and not other ID tags similar or identical to ID tag 1000) would enter the active mode upon receipt of wake-up signal 2500. In other embodiments, the identification code may be generic for all such ID tags, such that all ID tags within a pre-determined proximity will receive wake-up signal 2500 and will enter the active mode.

The example of FIG. 1 also comprises infrared module 1160 coupled to substrate 1200 to interface with beacon circuit 1100. In the present example, infrared module 1160 is configured to control one or more infrared emitters 1161 to emit infrared pulses when the active mode is enabled for beacon circuit 1100. In some examples, infrared emitters 1161 can comprise light emitting diodes (LEDs). The infrared pulses can be used, for example, to covertly identify personnel during rescue operations where rescue personnel employ infrared vision systems. In the same or other implementations, infrared module 1160 can control one or more infrared emitters 1161 to emit infrared pulses at predetermined frequencies or sequences, where the infrared pulses can be received and decoded by an infrared detection mechanism. In the present example, infrared module 1160 is coupled to watchdog module 1111 for enablement upon receipt of wake-up signal 2500. In other embodiments, infrared module 1160 can be coupled to switch 1130 for enablement upon actuation of switch 1130. Other embodiments may omit infrared module 1160, where infrared emitters 1161 could be controlled instead by IC a component of IC 1900 such as transmitter module 1110 or watchdog module 1111. There can also be embodiments where infrared emitters 1161 form part of supporting components 1150, such that infrared emitters 1161 are fabricated over substrate 1200. Other embodiments may omit infrared module 1160 and infrared emitters 1161 altogether.

Focusing on FIG. 2 now, detection mechanism 2000 is presented therein as comprising one or more detection antennas 2100 coupled to signal detector 2200. Signal detector 2200 comprises scanner 2210 coupled to the one or more antennas 2100, signal processor 2230 coupled to scanner 2210, and memory module 2220 coupled to signal processor 2230. There can be embodiments where at least one of the one or more antennas 2100 comprises a directional Yagi antenna, and/or where at least one of the one or more antennas 2100 comprises a synthetic Doppler antenna. In some examples, detection mechanism 2000 can be portable and movable to scan for beacon signal 1500 of ID tag 1000 throughout different areas. In some examples, detection mechanism can be adapted for portability in a backpack of a user, in a motorized vehicle, and/or in an aircraft.

In the present example, signal detector 2200 is configured to implement a signal averaging mechanism for an improved signal-to-noise ratio and significantly enhanced detection range when detecting and/or deciphering beacon signal 1500 sent from ID tag 1000. In general, signal averaging can be used to detect a repetitive signal sequence, improving the signal-to-noise ratio by the square root of the number averaged. The improved range and signal-to-noise ratio can be provided by repeated scans where signal counts add up linearly for each time the repetitive signal sequence is detected, while noise counts, being non-repetitive, add up as the square root of the number of scans. Eventually, because noise counts add up at a lower pace than signal counts, the repetitive signal sequence initially buried within noise becomes observable with repeated scans.

As an example, assuming that the identification code for ID tag 1000 comprises a 5-bit code transmitted 4,000 times in 1 second via beacon signal 1500, an average of the 4,000 codes will improve the signal-to-noise ratio by the square root of 4,000, or approximately 63 times. Because radio signals degrade by the distance squared, signal averaging can improve the effective transmit distance for beacon signal 1500 by the square root of 63, or approximately 8 times.

Figure 4:
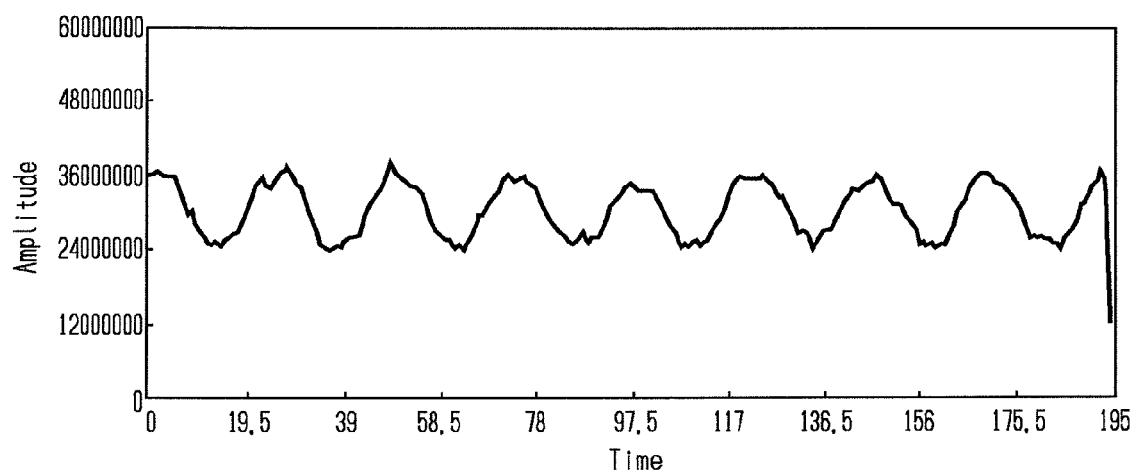
FIG. 4 illustrates a second plot of a scan by the detection mechanism of FIG. 2 for the beacon signal from the ID tag of FIG. 1, where the scan has been signal averaged to detect the beacon signal.

Experimental results have confirmed the viability of the signal averaging mechanism for increasing the signal-to-noise ratio and the detection range of a repetitive signal sequence representative of beacon signal 1500. A low power transmitter with a power ratio of 10 dBm was used to transmit a repetitive signal sequence of 1s and 0s at a data rate of approximately 1 kilohertz. Without signal averaging, as shown in FIG. 3, the repetitive signal sequence was not detectable. With signal averaging, the repetitive signal sequence was detectable after only 675 sample scans, as shown in FIG. 4, at a distance of approximately 1 kilometer, even through large industrial buildings.

The signal averaging mechanism implemented by signal detector 2200 relies on scanner 2210 to repeatedly scan antennas 2100 for signal counts and noise counts, where the signal counts and noise counts are then additively stored in memory module 2220. The signal counts are then parsed from the noise counts by signal processor 2230, using signal averaging to decipher beacon signal 1500 out of the noise signals. Signal processor 2230 comprises a signal averaging module in the present example.

In the present or other embodiments, signal detector 2200 can also be configured to implement a fundamental frequency analysis mechanism for improved signal-to-noise ratio and significantly enhanced detection range when detecting and/or deciphering beacon signal 1500 sent from ID tag 1000. The presence of a fundamental frequency in scanned samples of data can be indicative of the presence of a target signal such as beacon signal 1500. In some examples, the fundamental frequency analysis mechanism can be implemented via Fourier transforms of scanned samples of data.

Figure 5:
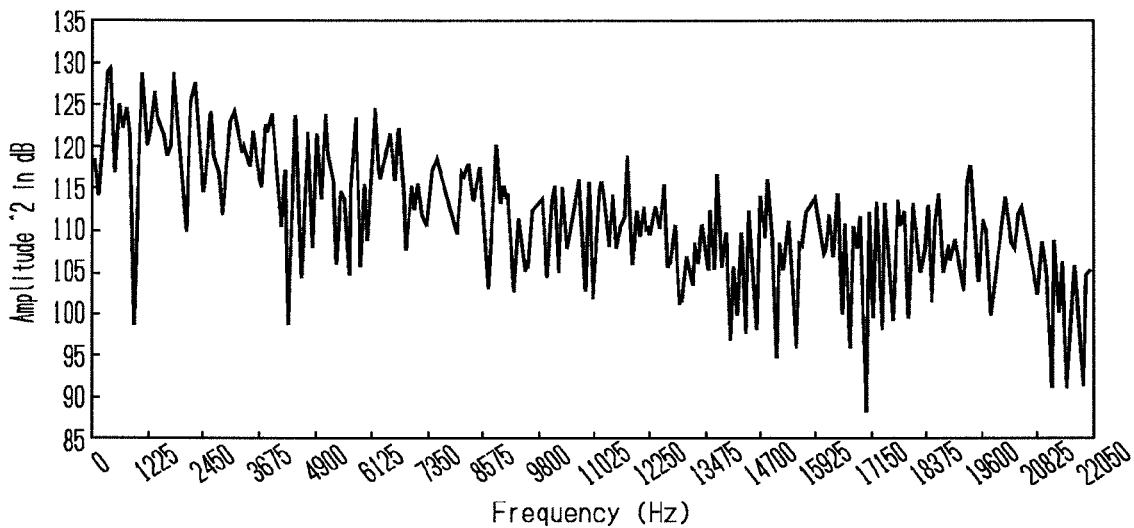
FIG. 5 illustrates a third plot of a scan by the detection mechanism of FIG. 2 for the beacon signal from the ID tag of FIG. 1, where the plot is based on a small sample size processed in search of the fundamental frequency of the beacon signal.
Figure 6:
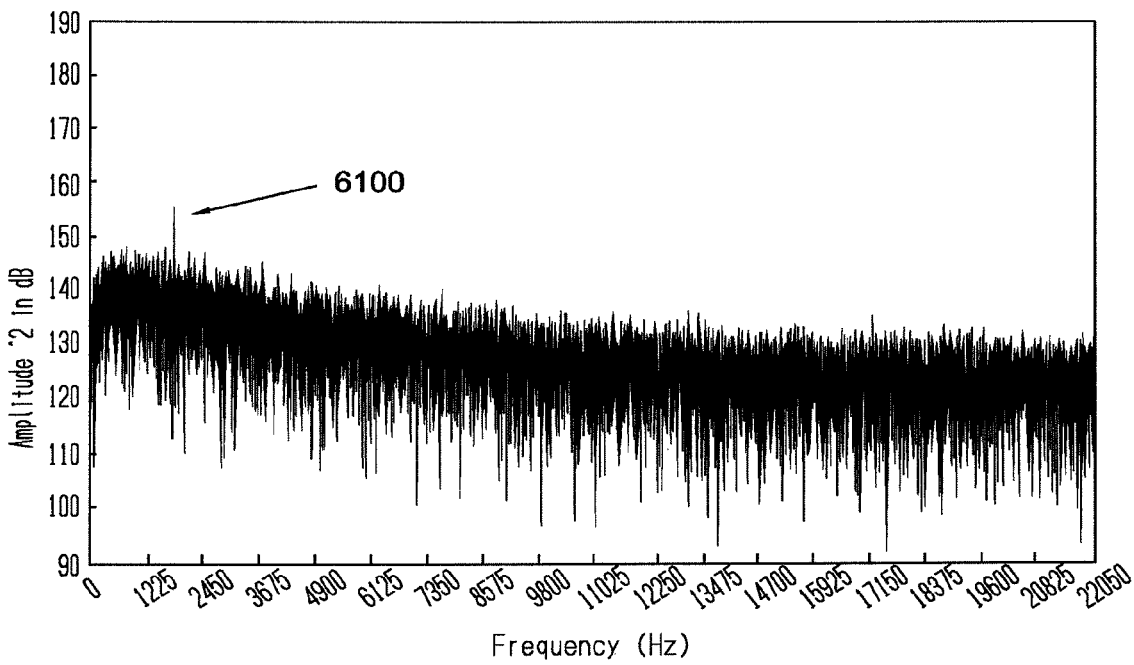
FIG. 6 illustrates a fourth plot of a scan by the detection mechanism of FIG. 2 for the beacon signal from the ID tag of FIG. 1, where the plot is based on an adequate sample size to detect a spur of the fundamental frequency of the beacon signal.

Experimental results have also confirmed the viability of the fundamental frequency detection analysis for increasing the detection range of a repetitive signal sequence representative of beacon signal 1500. As seen in FIG. 5, after 512 samples captured at a distance of approximately 1 kilometer, the fundamental frequency is not yet discernible. As seen in FIG. 6, however, after 16,384 samples captured at the same distance, the fundamental frequency of the target signal is clearly visible as spur 6100 in the graph.

The fundamental frequency analysis mechanism implemented by signal detector 2200 relies on scanner 2210 to repeatedly scan antennas 2100 for frequency samples, where the frequency samples are then stored in memory module 2220. The frequency samples are then analyzed by signal processor 2230, which in the present example also comprises a frequency analyzer, using signal processing methods such as Fourier transforms to detect the presence of the fundamental frequency of beacon signal 1500.

Although in the present embodiment detection mechanism 2000 has been described as capable of performing both signal averaging and fundamental frequency analysis to detect and/or decipher beacon signal 1500, there can be other embodiments where detection mechanism 2000 would be capable of performing only one of the signal averaging of the fundamental frequency analysis when scanning for beacon signal 1500.

Figure 7:
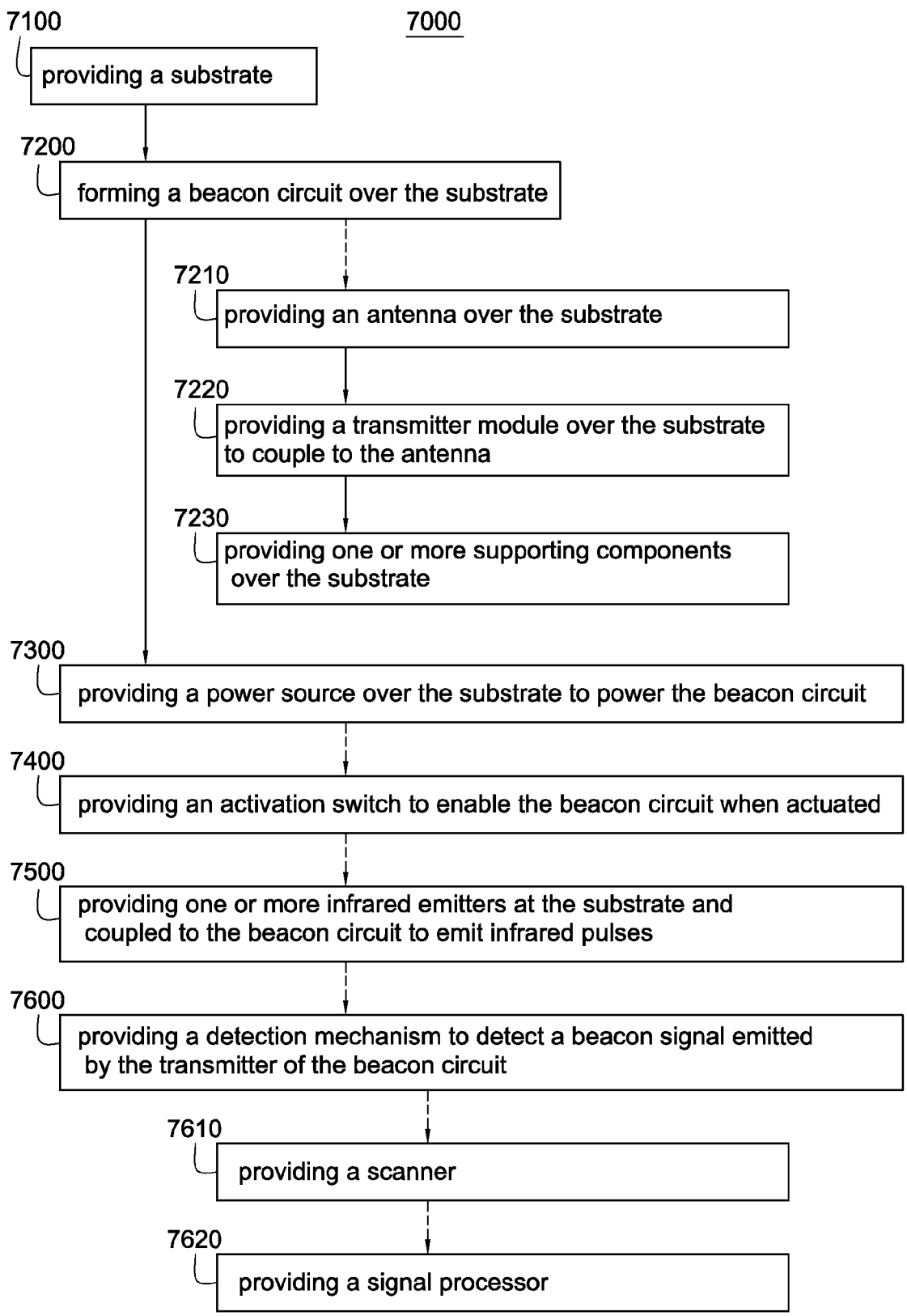
FIG. 7 illustrates a flowchart of a method for providing an electronic identification system in accordance with the present disclosure.

Moving along, FIG. 7 illustrates a flowchart of a method for providing an electronic identification system in accordance with the present disclosure. In some embodiments, the electronic identification system of method 7000 can be similar to identification system 100, and can comprise an ID tag similar to ID tag 1000 as described above for FIGS. 1-2.

Block 7100 of method 7000 comprises providing a plastic substrate. In some examples, the plastic substrate of block 7100 can be similar to substrate 1200 as described above for ID tag 1000. Like substrate 1200, the substrate of method 7000 is capable of being shaped and flexed such as to be more easily and inconspicuously embedded or integrated with clothing or equipment of a person or asset desired to be tracked. In some embodiments, the substrate of method 7000 can be plastic, as described above for substrate 1200, such as to limits its detectability by magnetometers. In other embodiments, however, such as where detectability by magnetometers is less of a concern, the substrate of method 7000 can comprise other materials such as a stainless steel material, a silicon material, an iron nickel (FeNi) alloy material (e.g., FeNi, FeNi36, or Inver™; where Inver™ comprises an alloy of iron (64 percent (%)) and nickel (36%) (by weight) with some carbon and chromium), an iron nickel cobalt (FeNiCo) alloy material (e.g., Kovar™, where Kovar™ typically comprises 29% nickel, 17% cobalt, 0.2% silicon, 0.3% manganese, and 53.5% iron (by weight)), a titanium material, a tantalum material, a molybdenum material, an aluchrome material, and/or an aluminum material.

Block 7200 of method 7000 comprises forming a beacon circuit over the substrate of block 7100. In some embodiments, the beacon circuit of block 7200 can be similar to beacon circuit 1100 of ID tag 1000, and/or variations thereof as described above with respect to FIG. 1. There can be examples where all components of the beacon circuit of block 7200 are fabricated over the substrate of method 7100. In other embodiments, part of the components are attached to the substrate rather than being merely formed over the substrate. Block 7200 can comprise several sub-blocks, as described below.

Block 7210 of method 7000 is a sub-block of block 7200, and comprises providing an antenna over the substrate of block 7100. In some embodiments, the antenna of block 7210 can be similar to antenna 1120 as described for FIG. 1. In some embodiments, the antenna of block 7210 is fabricated over the substrate of block 7100. In other embodiments, the antenna can be attached to the substrate by suitable means such as via an adhesive. There can also be embodiments where the antenna is embedded with the substrate, such as between layers of the substrate or between the substrate and another layer, such as a plastic protective layer, a passivation layer, and/or a planarization layer over the substrate. In some examples, the antenna can comprise a loop antenna, where the loop antenna can traverse a portion of a periphery of the substrate in some implementations. In other examples, the antenna can comprise a bowtie antenna or other antenna shape or configuration.

Block 7220 of method 7000 is also a sub-block of block 7200, and comprises providing a transmitter module over the substrate of block 7100 to couple to the antenna of block 7210. In some examples, the transmitter module of block 7220 can be similar to transmitter module 1110 coupled to antenna 1120, as described above for ID tag 1000 (FIG. 1). The transmitter module of block 7220 can be configured in some embodiments to emit a beacon signal similar to beacon signal 1500 (FIGS. 1-2). For example, the beacon signal can be emitted via the antenna of block 7210 and can be detectable at a range of approximately one kilometer. In the same or other examples, the beacon signal can comprise a UHF radio pulse and/or an UWB signal at a frequency of over 1 gigahertz. The beacon signal can be periodic or intermittent, being repeated after a constant or varying predetermined amount of time has elapsed. In the same or other examples, the periodicity of the beacon signal can be adjusted to conserve power.

In some examples, providing the transmitter module in block 7220 can comprise providing a COTS integrated circuit coupled to the plastic substrate of block 7100. In such examples, providing the transmitter module can also comprise providing a crystal module to couple with the COTS integrated circuit, where the crystal module can be used to set a reference frequency for transmissions from the transmitter module. The COTS integrated circuit can be similar to that described above for IC 1900.

In other examples, providing the transmitter module in block 7220 can comprise mounting an ASIC bare die over the plastic substrate of block 7100, where the ASIC bare die can be similar to that described above for IC 1900. In some examples, the ASIC bare die can be thinned to comprise a thickness of less than approximately 100 micrometers. In the same or other examples, the ASIC bare die can be configured to be flexible along with the substrate of block 7100 when mounted.

The transmitter module of block 7220 can be provided in some examples to alternate between a sleep mode and an active mode. The sleep mode can be configured to limit the functionality of the transmitter module and thereby conserve power, while the active mode can be configured for transmitting the beacon signal. In examples where the transmitter module is capable of alternating between the sleep mode and the active mode, a watchdog module can be provided coupled to the beacon circuit such as to toggle the transmitter module between the sleep and active modes. For example, the watchdog module can scan the antenna of block 7210 for a wake-up signal when the transmitter module is in the sleep mode, and can enable the active mode upon receipt of the wake-up signal. In some examples, the watchdog module of block 7220 can be similar to watchdog module 1111 as described above with respect to FIG. 1. There can be examples where the wake-up signal monitored by the watchdog circuit can be similar to wake-up signal 2500, as described above for FIGS. 1-2. In the same or other example, the wake-up signal can be similar to activation signal 1131 as described above for FIG. 1.

Block 7230 of method 7000 is a sub-block of block 7200, and comprises forming one or more supporting components over the substrate of block 7100 to couple with at least one of the antenna of block 7100 or the transmitter module of block 7220. In some examples, the supporting components of block 7230 can be similar to supporting components 1150 of beacon circuit 1100 as described above for FIG. 1, and/or can assist with the interconnection or signal transfer between elements of the beacon circuit of block 7200. In the same or other examples, the supporting components can be formed over the substrate of block 7100.

Continuing with method 7000, after block 7200, block 7300 comprises providing a power source over the substrate of block 7100 to power the beacon circuit of block 7200. In some examples, the power source of block 7300 can be similar to the battery described above with respect to power source 1300 of ID tag 1000 in FIG. 1. In the same or other examples, the power source can be rechargeable and/or replaceable.

In some embodiments, method 7000 can include optional block 7400, which comprises providing an activation switch to enable the beacon circuit of block 7200 when the activation switch is actuated. In some examples, the activation switch can be similar to activation switch 1130 of ID tag 1000 (FIG. 1), configured to emit activation signal 1131 to enable the active mode for beacon circuit 1100 in FIG. 1.

Method 7000 can also include optional block 7500 in some examples, where block 7500 comprises providing one or more infrared emitters at the substrate coupled to the beacon circuit. In one embodiment, block 7500 is included in method 7000 without block 7400, and in another embodiment, block 7400 is included in method 7000 without block 7500. In a further embodiment, neither block 7400 nor 7500 is included in method 7000, and in yet another embodiment, both of blocks 7400 and 7500 are included in method 7000.

The infrared emitters of block 7500 can be similar to infrared emitters 1161 described above for ID tag 1000 (FIG. 1) in some examples. In the same or other examples, the infrared emitters can be coupled to an infrared module like infrared module 1160 (FIG. 2) and/or be controlled thereby based on, for example, whether the active mode has been enabled. In some examples, infrared pulses emitted by the infrared emitters can be configured to be visible with infrared vision systems, such as in situations where identifying friend from foe is important. In the same or other examples, the infrared pulses can be controlled to convey a code or other information receivable and decodable by infrared detection mechanisms.

Block 7600 of method 7000 comprises providing a detection mechanism to detect the beacon signal emitted by the transmitter module of the beacon circuit described for block 7200. In some embodiments, the detection mechanism of block 7600 can be similar to detection mechanism 2000 as described above with respect to FIG. 2. As an example, providing the detection mechanism can comprise providing a scanner coupled to one or more detection antennas, where the scanner can be similar to scanner 2210, and the one or more detection antennas can be similar to the one or more detection antennas 2100 of detection mechanism 2000 (FIG. 2). In the same or different examples, providing the detection mechanism can comprise providing a signal processor coupled to the scanner, where the signal processor can be similar to signal processor 2230 as described for FIG. 2. In such examples, the signal processor of block 7600 can comprise a signal averaging module to decipher the beacon signal by parsing signal counts and noise counts from scanned data from the scanner. In another embodiment, the signal processor of block 7600 can comprise a frequency analyzer module to detect a fundamental frequency of the beacon signal out of a plurality of frequency samples captured by the scanner. There can also be embodiments where the detection mechanism of block 7600 can comprise both the signal averaging module and the frequency analyzer module.

In some examples, one or more of the different blocks of method 7000 can be combined into a single block or performed simultaneously, and/or the sequence of such blocks can be changed. For example, the transmitter module in block 7220 can be provided after the one or more supporting components of block 7230 in some embodiments. Similarly, the battery in block 7300 can be provided in some examples before providing the transmitter module in block 7220. As another example, the infrared emitters in block 7500 can be provided simultaneously with the one or more supporting components of block 7230, and/or block 7500 could be merged as a sub-part of block 7200. In the same or other examples, some of the steps of method 7000 can be subdivided into several sub-steps. For example, block 7600 could be subdivided into a block 7610 for providing the scanner, and a block 7620 for providing the signal processor.

There can also be examples where method 7000 can comprise further or different procedures. As an example, method 7000 could comprise another block for providing clothing or equipment tailored to inconspicuously accommodate the beacon circuit of block 7200 and/or an ID tag similar to ID tag 1000 (FIG. 1). Some of the blocks of method 7000 can also be optional in some implementations. As an example, blocks 7400, 7500, and/or 7600 can be optional in some applications. Other variations can be implemented for method 7000 without departing from the scope of the present disclosure.

Although the flexible identification systems and related methods herein have been described with reference to specific embodiments, various changes may be made without departing from the spirit or scope of the present disclosure. For example, in some embodiments, power source 1300 (FIG. 1) could comprise other sources of power different than a battery, such as for example a solar cell. Additional examples of such changes have been given in the foregoing description. Accordingly, the disclosure of embodiments herein is intended to be illustrative of the scope of the invention and is not intended to be limiting. It is intended that the scope of this application shall be limited only to the extent required by the appended claims. The flexible identification systems and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    an apparatus comprising:
        a plastic substrate;
        a beacon circuit comprising:
            a transmitter module coupled to the plastic substrate;
            an antenna supported by the plastic substrate and coupled to the transmitter module;
            one or more supporting components supported by the plastic substrate;
            a watchdog module coupled to the transmitter module;
            a wireless receiver coupled to the watchdog module;
            a memory coupled to the watchdog module;
            an identification code stored in the memory; and
            an internal clock coupled to the watchdog module; and
        a power source coupled to the plastic substrate to power the transmitter module;
    wherein:
        the plastic substrate is flexible;
        the transmitter module is configured to alternate between:
            a sleep mode to conserve a charge of the power source; and
            an active mode for transmission of a beacon signal via the beacon circuit;
        the watchdog module is configured to:
            use the antenna to scan for a wake-up signal during the sleep mode; and
            enable the active mode upon receipt of the wake-up signal;
        the identification code is configured to define one or more sequential time ratios between receipt of two or more pulses of the wake-up signal; and
        the watchdog module enables the active mode when the wireless receiver receives the two or more pulses of the wake-up signal sequentially separated by the one or more sequential time ratios defined by the identification code.

2. The system of claim 1, wherein:
the apparatus further comprises:
a switch coupled to the beacon circuit to enable the active mode when actuated.

3. The system of claim 1, wherein:
the apparatus is configured to be inconspicuously embedded in clothing.

4. The system of claim 1, wherein:
the beacon circuit is configured to emit the beacon signal to be decipherable at a range of at least approximately 1 kilometer.

5. The system of claim 1, wherein:
the power source comprises a battery configured to power the beacon circuit to emit the beacon signal for at least approximately 24 hours.

6. The system of claim 1, wherein:
the apparatus further comprises:
one or more infrared emitters coupled to the beacon circuit and configured to emit an intermittent infrared pulse when the active mode is enabled.

7. The system of claim 1, further comprising:
a detection mechanism comprising:
one or more detection antennas; and
a signal detector comprising:
a scanner coupled to the one or more detection antennas;
a memory module configured to additively store signal counts and noise counts as scan data from repeated scans of the scanner; and
a signal averaging module to parse the signal counts from the noise counts in the scan data to decipher the beacon signal.

8. The system of claim 1, further comprising:
a detection mechanism comprising:
one or more detection antennas; and
a signal detector comprising:
a scanner coupled to the one or more detection antennas;
a memory module configured to store a plurality of frequency samples from the scanner; and
a frequency analyzer module to detect a fundamental frequency of the beacon signal out of the plurality of frequency samples.

9. The system of claim 1, further comprising:
a detection mechanism comprising at least one of a Yagi antenna or a synthetic Doppler antenna;
wherein the detection mechanism is configured to detect the beacon signal at a distance of approximately 1 kilometer when the beacon signal is transmitted by the beacon circuit at a power ratio of approximately 10 dBm.

10. The system of claim 1, wherein:
the beacon circuit further comprises:
a COTS integrated circuit comprising the transmitter module and coupled to the plastic substrate; and
a crystal coupled to the transmitter module to set a transmission frequency for the beacon signal.

11. The system of claim 1, wherein:
the beacon circuit further comprises:
an ASIC circuit in bare die form comprising the transmitter module and coupled to the plastic substrate.

12. The system of claim 11, wherein:
the ASIC circuit comprises a thickness of less than approximately 100 micrometers and is configured to flex along with the plastic substrate.

13. The system of claim 1, wherein:
the beacon circuit is configured to emit the beacon signal as an intermittent UHF radio pulse via the antenna.

14. The system of claim 1, wherein:
the beacon circuit is configured to emit the beacon signal as a UWB signal at a frequency of over 1 gigahertz.

15. The system of claim 1, wherein:
the transmitter module is configured to generate the beacon signal as a UWB signal at a transmission frequency of over 1 gigahertz without using a frequency-setting crystal.

16. A method comprising:
providing a plastic substrate;
forming a beacon circuit over the plastic substrate;
providing a power source over the plastic substrate to power the beacon circuit; and
providing a detection mechanism to detect a beacon signal emitted by a transmitter module of the beacon circuit;
wherein:
the plastic substrate is flexible;
forming the beacon circuit comprises:
providing an antenna over the plastic substrate;
providing the transmitter module over the plastic substrate to couple to the antenna; and
providing one or more supporting components over the plastic substrate to couple to the transmitter module;
and
providing the detection mechanism comprises:
providing a scanner coupled to one or more detection antennas; and
providing a signal processor coupled to the scanner and comprising at least one of:
a signal averaging module to decipher the beacon signal by parsing signal counts and noise counts out of scanned data from the scanner; or
a frequency analyzer module to detect a fundamental frequency of the beacon signal out of a plurality of frequency samples captured by the scanner.

17. The method of claim 16, wherein:
providing the antenna comprises forming the antenna over the plastic substrate; and
providing the one or more supporting components comprises forming the one or more supporting components over the plastic substrate.

18. The method of claim 16, wherein:
providing the plastic substrate comprises:
providing a shape of the plastic substrate to be inconspicuously embedded in clothing.

19. The method of claim 16, further comprising:
providing one or more infrared emitters at the plastic substrate and coupled to the beacon circuit to emit infrared pulses.

20. The method of claim 16, further comprising:
providing an activation switch to enable the beacon circuit when actuated.

21. The method of claim 16, wherein:
providing the transmitter module comprises:
providing the transmitter module to alternate between:
a sleep mode to conserve a charge of the power source; and
an active mode for transmitting a beacon signal via the beacon circuit.

22. The method of claim 21, further comprising:
providing a watchdog module coupled to the beacon circuit to:

scan the antenna for a wake-up signal during the sleep mode; and
enable the active mode upon receipt of the wake-up signal.

23. The method of claim 16, wherein:
providing the transmitter module comprises:
configuring the transmitter module to emit via the antenna a beacon signal detectable at a range of at least approximately one kilometer and comprising at least one of:
a intermittent UHF radio pulse; or
an UWB signal at a frequency of over 1 gigahertz.

24. The method of claim 16, wherein:
providing the transmitter module comprises:
providing a COTS integrated circuit coupled to the plastic substrate; and
providing a crystal module coupled to the COTS integrated circuit.

25. The method of claim 16, wherein:
providing the transmitter module comprises:
mounting an ASIC bare die over the plastic substrate.

26. The method of claim 16, wherein:
providing the transmitter module comprises:
providing an ASIC bare die with a thickness of less than approximately 100 micrometers; and
mounting the ASIC bare die over the plastic substrate to be flexible along with the plastic substrate.

27. The method of claim 16, wherein:
providing the signal processor comprises:
providing the signal averaging module to decipher the beacon signal by parsing the signal counts and the noise counts out of the scanned data from the scanner.

28. The method of claim 16, wherein:
providing the signal processor comprises:
providing the frequency analyzer module to detect the fundamental frequency of the beacon signal out of the plurality of frequency samples captured by the scanner.

29. A system comprising:
an apparatus comprising:
a plastic substrate;
a beacon circuit comprising:
a transmitter module coupled to the plastic substrate and configured to emit a beacon signal detectable at a range of at least approximately 1 kilometer;
an antenna supported by the plastic substrate and coupled to the transmitter module;
one or more solid state components supported by the plastic substrate;
a watchdog module comprising an internal clock and coupled to the antenna;
a memory module coupled to the watchdog module;
an identification code stored in the memory module and configured to define one or more time ratios between sequential receipt of two or more RF pulses of a wake-up signal; and
an ASIC bare die coupled to the plastic substrate and comprising at least one of the transmitter module, the watchdog module, or the memory module;
and
a battery coupled to the plastic substrate and configured to power the transmitter module for at least approximately 24 hours;
wherein:
the apparatus comprises a shape configured to be inconspicuously embedded in clothing;
the transmitter module is configured to alternate between:
a sleep mode to conserve a charge of the battery; and
an active mode for transmission of the beacon signal;
the beacon signal comprises an UWB signal at a frequency of over 1 gigahertz;
the beacon circuit is configured to emit the beacon signal absent a frequency-setting crystal;
the watchdog module is configured to:
use the antenna to scan for the wake-up signal during the sleep mode; and
enable the active mode when the wake-up signal received complies with the identification code;
the plastic substrate is flexible; and
the ASIC bare die comprises a thickness of between approximately 50 micrometers to approximately 100 micrometers and is configured to flex along with the plastic substrate.

30. The system of claim 29, further comprising:
a detection mechanism comprising:
one or more detection antennas comprising at least one of:
a Yagi antenna; or
a synthetic Doppler Antenna;
a signal detector configured to detect the beacon signal at a distance of at least approximately 1 kilometer when the beacon signal is transmitted by the beacon circuit at a power ratio of approximately 10 dBm; the signal detector comprising:
a scanner coupled to the one or more detection antennas; and
at least one of:
a signal averaging module coupled to the scanner to decipher the beacon signal by parsing signal counts and noise counts out of scanned data from the scanner; or
a frequency analyzer module coupled to the scanner to detect a fundamental frequency of the beacon signal out of a plurality of frequency samples captured by the scanner.

* * * * *